United States Patent [19]

Anderson

[11] Patent Number: 4,653,974

[45] Date of Patent: Mar. 31, 1987

[54] SYSTEM FOR TRANSPORTING AND ERECTING VERY LARGE AND HEAVY CONSTRUCTION EQUIPMENT

[76] Inventor: Stanley J. Anderson, 10303 Channel Rd., Lakeside, Calif. 92040

[21] Appl. No.: 576,540

[22] Filed: Feb. 3, 1984

[51] Int. Cl.[4] .............................................. B65G 67/02

[52] U.S. Cl. .................................... 414/343; 414/345; 414/786; 414/353

[58] Field of Search ............... 414/340, 345, 346, 498, 414/499, 786, 481, 500, 343, 353; 212/180, 181; 410/1; 52/116, 117; 104/45

[56] References Cited

U.S. PATENT DOCUMENTS

| | | | |
|---|---|---|---|
| 3,091,312 | 5/1963 | Woody et al. | 414/346 X |
| 3,143,979 | 8/1964 | Eckersall | 410/1 |
| 3,175,718 | 3/1965 | Dempster et al. | 414/345 X |
| 3,198,363 | 8/1965 | Snead | 414/345 |
| 3,219,218 | 11/1965 | Hand | 414/345 X |
| 3,302,806 | 2/1967 | Brown et al. | 414/341 |
| 3,664,533 | 5/1972 | Hand | 414/353 X |
| 3,987,918 | 10/1976 | Corompt | 414/500 X |
| 4,091,935 | 5/1978 | Whittingham | 212/181 |
| 4,423,885 | 1/1984 | Camey et al. | 414/481 X |

*Primary Examiner*—Robert J. Spar

*Assistant Examiner*—Stuart J. Millman

*Attorney, Agent, or Firm*—Frank D. Gilliam

[57] ABSTRACT

A system for transporting and erecting very large, very heavy construction equipment such as cranes, earth augers or the like. Basically, the system consists of three components. The first component is an on-site movable support which can mount the working component such as a crane, auger, or the like during the construction work and which is movable with the working component at low speeds off-road at the construction site and at higher highway speeds on-road when the working component is removed. The second or working component consists of a crane, earth auger or the like and associated control drives. The third component is a large highway qualified truck which includes a mechanism for mounting the working component. In use, the working component is mounted on a truck which is driven to the construction site. The first component is also driven to the construction site and is aligned with the truck. A transfer mechanism then slides the working component from the truck to the on-site movable support. The construction equipment is then ready for work with a minimum of set-up activity. After the work is completed, the working component is returned to the truck for transport to the next working site.

10 Claims, 14 Drawing Figures

SYSTEM FOR TRANSPORTING AND ERECTING VERY LARGE AND HEAVY CONSTRUCTION EQUIPMENT

BACKGROUND OF THE INVENTION

This invention relates in general to very large mobile construction equipment and, more specifically, to very large cranes, earth augers or the like which are transported to a construction site and there installed on a movable support.

The construction of larger buildings, power lines, highways, etc., requires very large equipment such as cranes, earth augers, etc. Often, it is essential that the equipment be movable at the construction site. Because of the weight involved, the on-site movable support for the equipment is generally not "road legal" when rigged from construction use in that it may be too heavy, too wide or too slow for movement along roads and highways.

At present such large cranes or the like are disassembled, the various components are loaded onto a number of large trucks, usually with the aid of other, smaller cranes, which carry the components to the construction site. There, the equipment is reassembled, mounted on the site movable support and put into use. Particularly on highway, pipeline, powerline or similar liner projects, this disassembly/reassembly sequence must be performed quite often. This sequence occupies considerable time and requires the services of a number of highly skilled, highly paid, riggers.

Thus, there is a continuing need for improvements in such large construction equipment to allow convenient transport between working sites without the need for disassembly for transport and without the need for considerable rigger time.

SUMMARY OF THE INVENTION

The problems noted above, and others, are overcome by a system for transporting and erecting very large construction equipment such as cranes, earth augers or the like which consists of three basic components; namely, first an on-site movable support or carrier vehicle to carry the working equipment, e.g., crane or auger, during operation thereof, second a transport vehicle typically a large low-boy type truck trailer to move the working equipment between job sites and third the working equipment which is movable between the carrier vehicle and the transport vehicle. Transfer alignment means is provided to position the bed of a turntable on the carrier vehicle and the bed of the transport vehicle in a straight line relationship during equipment transfer. Transfer drive means is then positioned and operated to slide the working equipment which is mounted on a sled-like base, from one vehicle to the other.

BRIEF DESCRIPTION OF THE DRAWING

Details of the invention, and of preferred embodiments thereof, will be further understood upon reference to the drawing, wherein.

DETAILED DESCRIPTION OF THE INVENTION

Figure 2:
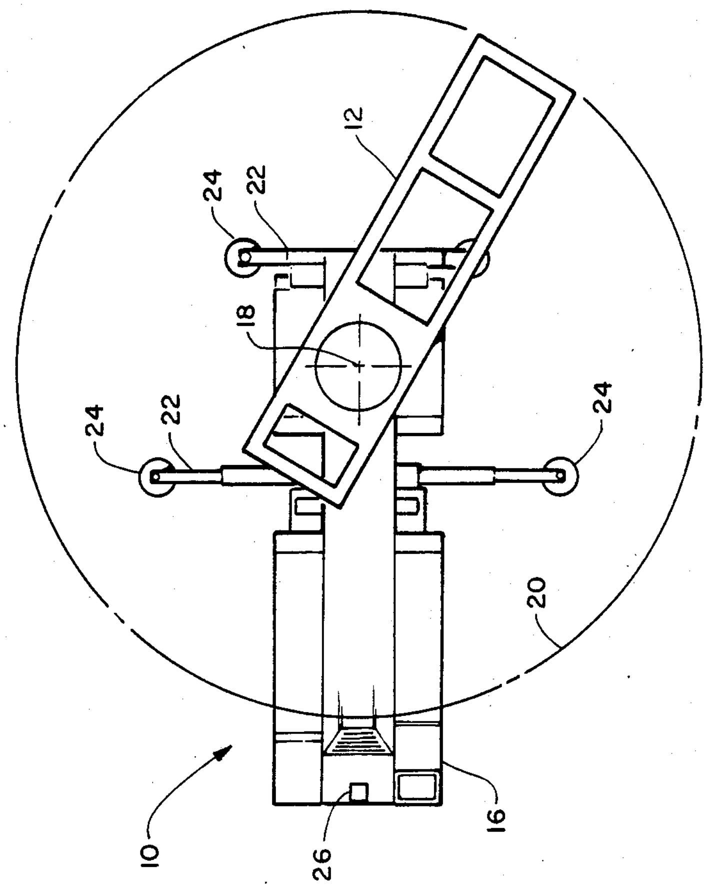
FIG. 2 is a schematic plan view of the carrier vehicle.
Figure 1:
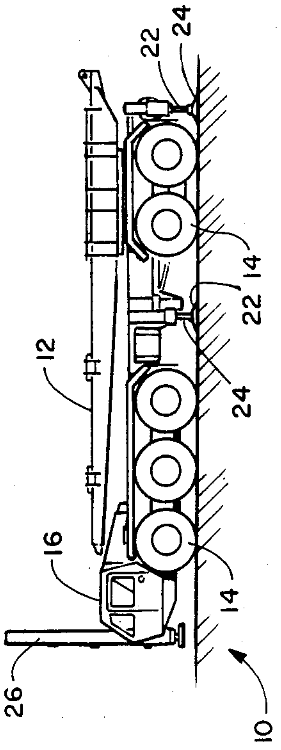
FIG. 1 is a schematic side elevation view of the carrier vehicle.

Referring now to FIGS. 1 and 2, there is seen an on-site carrier vehicle 10 which is capable of operating on roads at the usual highway speeds in the configuration shown and of operating off-road at low speeds when a crane, earth auger or the like is mounted on turntable 12. Typically, carrier 10 may have a length of about 40 feet and a width of about 12 feet and may weigh over 100,000 pounds. Preferably, carrier 12 is mounted on at least 10 wheels 14 on five axles, of which the front three are steerable and the aft two are driven. A conventional cab 16 is provided for the vehicle operator. Turntable 12 is positioned as seen in FIG. 1 during road transport and is rotatable around pivot 18 as indicated by circle 20 when in use as described below.

Suitable outriggers 22 are provided to stabilize carrier 10 during operation of the construction equipment carried by turntable 12. These are conventional hydraulically operated outriggers which can be retracted for road operation and extended during work with pads 22 hydraulically held against the earth.

A large hydraulic jack 26 is provided at the front of vehicle 10 to lift the front of vehicle 10 during transfer of construction equipment onto and off of turntable 12. Typically, the jack may have a 6 inch bore with a 3 inch rod, mounted in a 12 inch square telescoping box section, providing a 72 inch stroke.

Other components of carrier 10, such as engines, transmissions, etc., are conventional and are omitted from the drawing for clarity.

Figure 3:
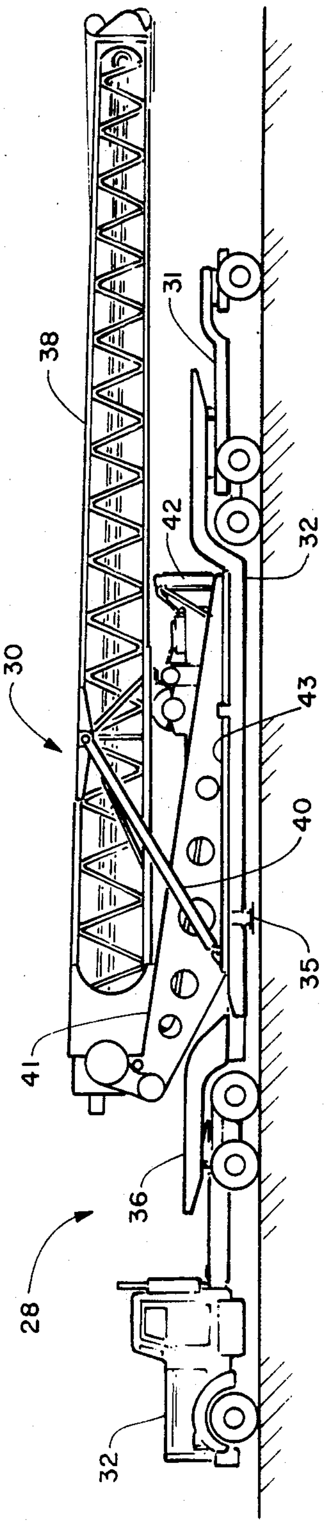
FIG. 3 is a schematic side elevation view of the transport vehicle with working equipment in place thereon.

FIG. 3 schematically illustrates a transport vehicle 28 carrying a large piece of construction equipment; here, a very large earth auger 30. Transport vehicle 28 includes a conventional truck tractor 29 towing a conventional low-boy type trailer 32 which includes a rear dolly 31. The front goose-neck 36 is removable from the trailer bed. Such removable goose-necks are available, for example, from the Murray Trailer Co., Stockton, Calif. These are removable in just a few minutes without the use of tools.

Trailer 32 includes one or two hydraulic jacks 35 located near the front of the load carrying section. These jacks are retracted during transport vehicle movement and can be extended to raise the front end of trailer 32, as detailed below.

The very large earth auger 30 which typically may be capable of drilling holes 20 feet in diameter to a depth of 270 feet, is secured to the bed of trailer in any conventional manner. Auger 30 includes an erectable boom 38 movable to a vertical position by hydraulic cylinders 40. Power equipment is contained in a housing at 42. The auger assembly is mounted on a base 41 having a sled-like lower surface and two narrow outwardly extending flanges 43 lying along the lower edges of base 41, each oriented parallel to the centerline of base or sled 41 and parallel to the direction of sliding movement as detailed below.

Figures 4, 5, 6:
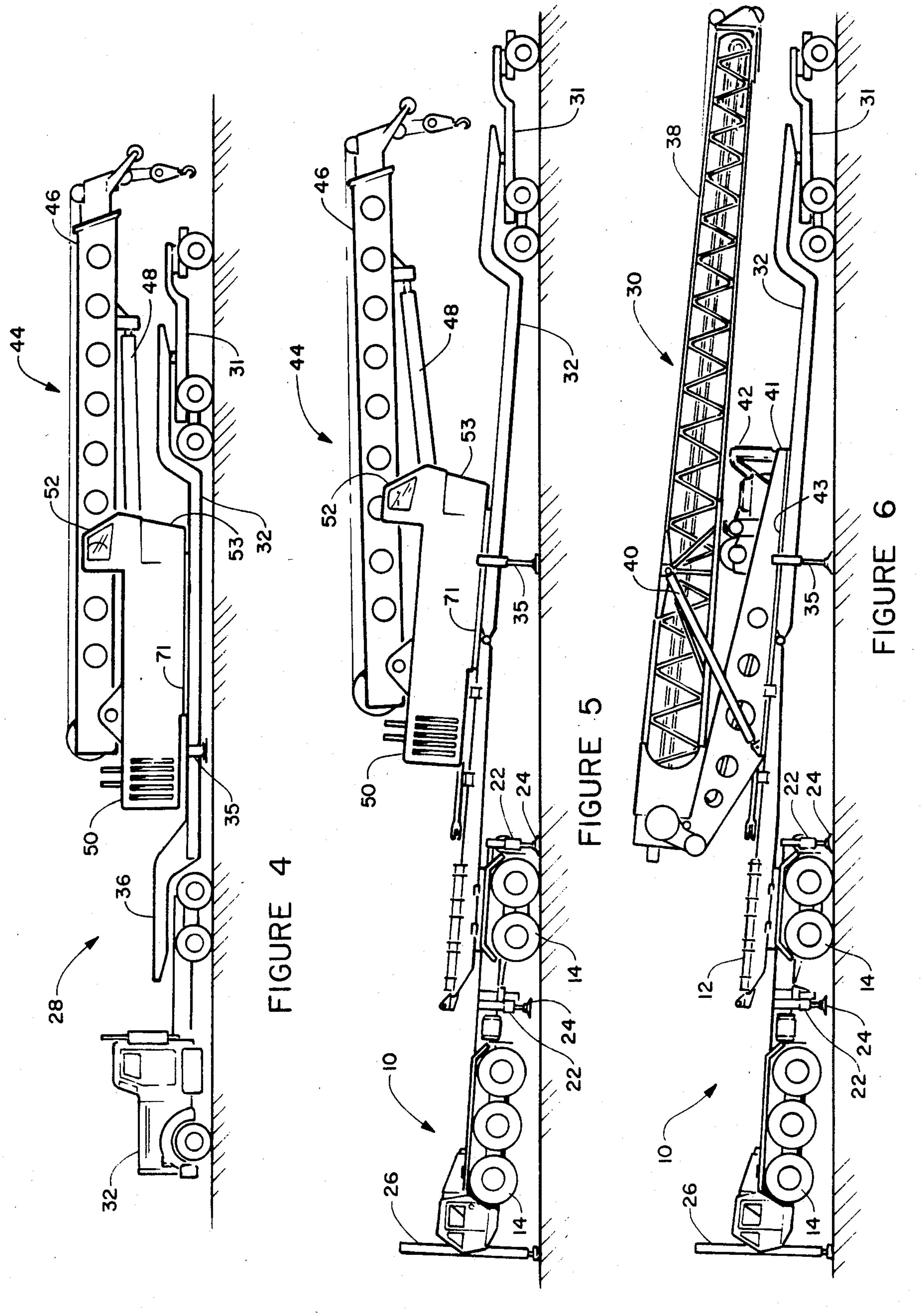
FIG. 4 is a schematic side elevation view of alternate working equipment in place on the transport vehicle.
FIG. 5 is a schematic side elevation view showing the working equipment in the process of being transferred from the transport vehicle to the carrier vehicle.
FIG. 6 is a schematic side elevation view of a second embodiment of working equipment being transferred from the transport vehicle to the carrier vehicle.

As shown in FIG. 4, transport vehicle 28 can also be used to transport other large construction equipment, such as crane 44. Crane 44 includes an erectable boom 46, erection hydraulic cylinders 48, power equipment housing 50, operator's cab 52 and the usual other auxiliary equipment, all mounted on a sled-like base 53 having outwardly extending flanges 71 as detailed below.

In the past, because of the very great weight and size of equipment such as auger 30 and crane 44, such equipment was disassembled into a number of parts, the parts were loaded onto several transport vehicles and reassembled at the job site. This required the aid of other equipment, to do the disassembly and loading, followed by unloading and reassembly. These operations required considerable time and the use of a crew of highly skilled, highly paid, riggers. As seen in FIGS. 5–10, with the system of my invention a very few workers can quickly and easily move large construction equipment and quickly set it up at a job site.

In order to move either crane 44 (FIGS. 4 and 5) or auger 30 (FIGS. 3 and 6), from trailer 32 to carrier vehicle 10, tractor 29 and goose-neck 36 are first removed. Then, jack 35 is extended to elevate the front end of trailer 32 to the required height. Carrier vehicle 10 is next positioned just in front of trailer 32 with turntable 12 swung to the rear. Jack 26 is extended to raise the front end of carrier vehicle 10 to bring the rear edge of turntable 12 into alignment with the front edge of trailer 32.

Figure 7:
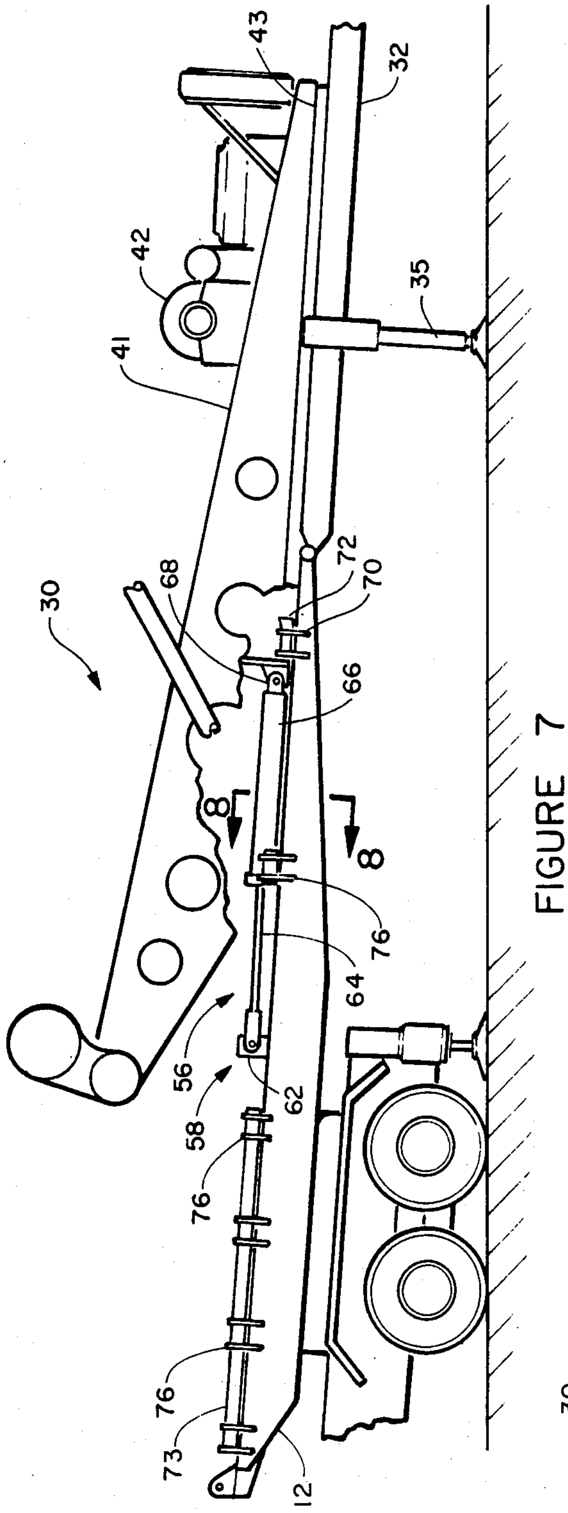
FIG. 7 is a schematic side elevation view of the working equipment partially moved onto the carrier turntable.
Figure 10:
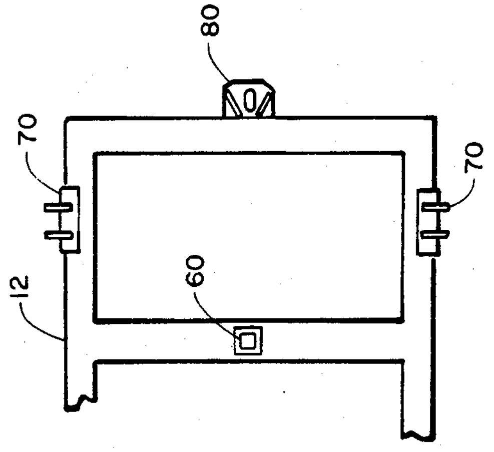
FIG. 10 is a schematic detail plan view of the end of the turntable which initially receives the working equipment sled.

An hydraulic step mechanism 56 is then positioned on turntable 12 as best seen in FIG. 7, which is a partial schematic view eliminating, for clarity, components not necessary to the description of the step mechanism. Step mechanism 56 includes a front connector 58 which can be connected to turntable 12 in any suitable manner. For example, downwardly extending box section member 60, (FIG. 10), may be provided on turntable 12 into which a box 62 of corresponding telescoping shape can be lowered and secured. Any alternative attachment method, such as eyes into which hooks on box 62 could be inserted, bolted fittings, etc., could be used. The shaft or rod 64 of hydraulic cylinder 66 is fastened to box 62. The other end of cylinder 66 is removably fastened to auger 30 base 41 through a pin fitting 68.

Figure 9:
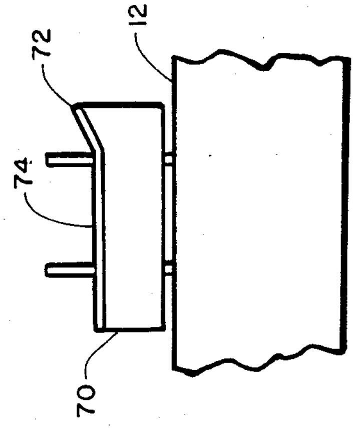
FIG. 9 is a detail plan view of the entry guide fo FIG. 7.
Figure 8:
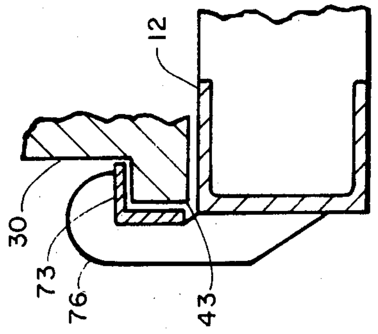
FIG. 8 is a detailed section view taken on line 8—8 in FIG. 7 showing the equipment sled guide means.

Once connected, step mechanism 56 is hydraulically retracted to slide sled base 41 from trailer 32 onto turntable 12. An entry guide 70 (as seen in FIG. 7 and in a schematic detail elevation view in FIG. 9) is located near the entry edge of turntable 12 to guide the narrow outwardly extending flange 43 of sled 41 straight onto the turntable. The view in FIG. 9 is an elevation view of the guide opposite that seen in FIG. 7, looking out from within the framework of turntable 12. The entry guide includes a tapered inwardly extending entry section 72 and a straight inwardly extending section 74 to guide flange 43 of sled base 41 into place. Additional edge guides 76 receive flange 43 as seen in FIG. 7 and in detail section view in FIG. 8 to assure that sled 41 continues to be correctly aligned with turntable 12 as it slides thereonto. Plates 73 may be provided between edge guides 76 to further contain and restrain flange 43. Guides 70 and 76 similarly cooperate with flange 71 on crane base 53 when the crane is alternatively moved onto turntable 12.

A tongue 80 may be provided at the end of turntable 12 to be bolted or otherwise fastened to the front edge of trailer 32 to aid in maintaining alignment between turntable 12 and trailer 32 during equipment transfer. Any other easily connected fastening means could be used between the abutting edges of turntable 12 and trailer 32, if desired.

Once cylinder 66 has pulled base 41 as far as possible in one step, hydraulic pressure is released, connection 58 is released, shaft 64 is extended and connector 58 is reconnected to another box section 60 further along turntable 12. This step-wise sliding is continued until the equipment is in the desired location on turntable 12. While the combination of edge guides 76 and plates 73 housing flanges 43 is generally sufficient to retain the equipment in place during use, additional fastening means such as bolts may be used, if desired.

Figure 11:
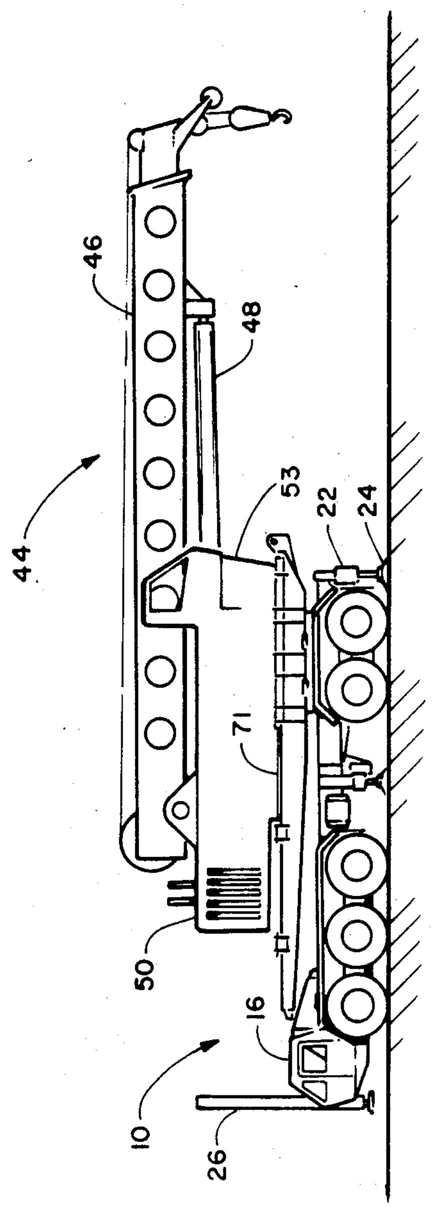
FIG. 11 is a schematic side elevation view of a first embodiment of working equipment on the carrier vehicle.
Figure 12:
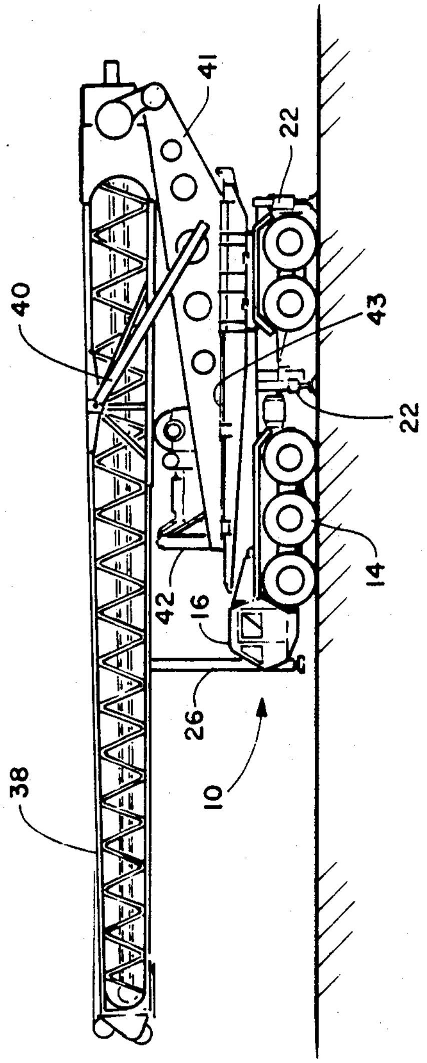
FIG. 12 is a schematic side elevation view of a second embodiment of the working equipment mounted on the carrier vehicle.

FIGS. 11 and 12 show crane 44 and auger 30, respectively, in place and ready to move off-road at the construction site. As can be seen, the booms 38 and 46 extend so far from the carrier vehicle, and the vehicle is now so heavy and large as to prohibit on-road use. Booms 38 and 46 may extend forwardly or rearwardly, as desired, during off-road movement.

Figure 13:
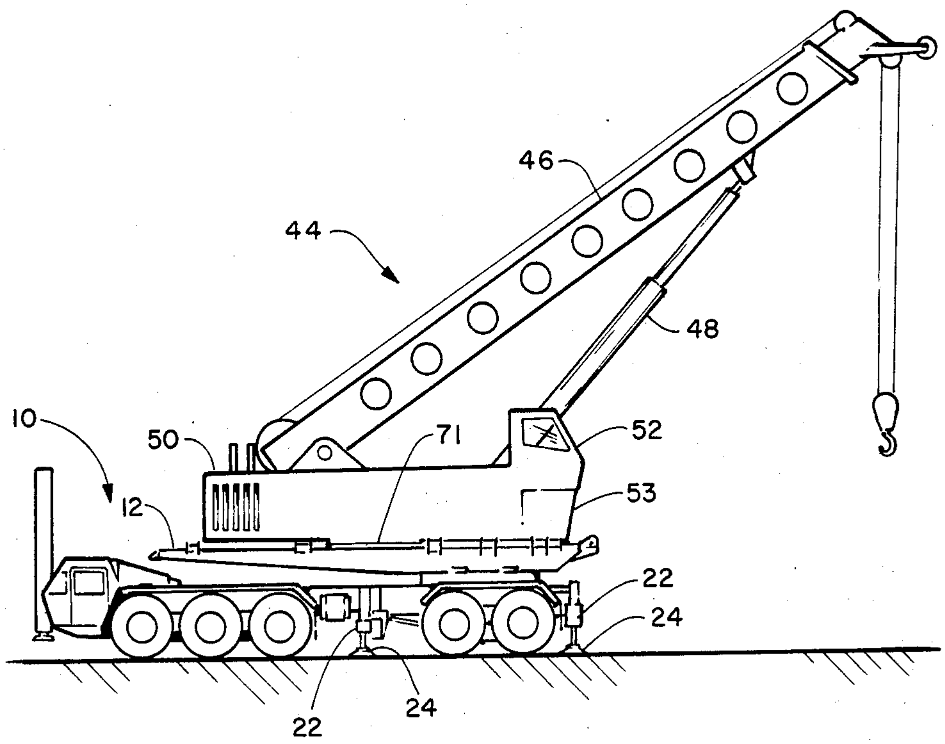
FIG. 13 is a schematic side elevation view of the working equipment embodiment of FIG. 11 in erected position on the carrier vehicle.
Figure 14:
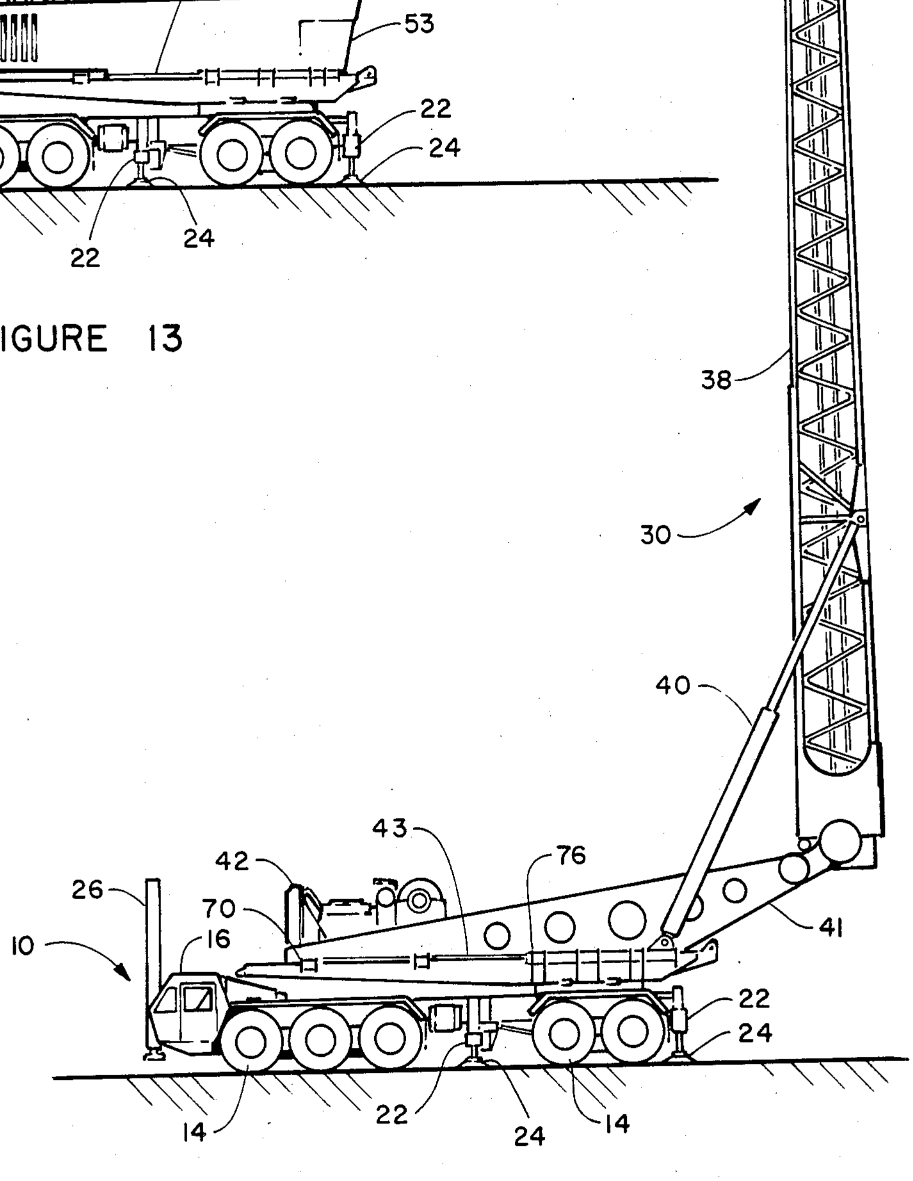
FIG. 14 is a schematic side elevation view of the working equipment embodiment of FIG. 12 in the erected position on the carrier vehicle.

Finally, FIGS. 13 and 14 show the crane 44 and auger 30, respectively, set up and working at a construction site. As seen in FIG. 13, outriggers 22 are extended as needed and pads 24 are in supporting contact with the earth. Hydraulic cylinders 48 have extended boom 46 into the working position. Turntable 12 can be rotated to any desired working position. As seen in FIG. 14, outriggers 22 are extended as needed and pads 24 are in ground contact. Hydraulic cylinders 40 have raised auger boom 38 to the required vertical working position.

Certain preferred components, arrangements and fittings have been described in conjunction with the above description of preferred embodiments of this invention. These may be changed or varied as described above, where suitable, with similar results. For example, other very large equipment other than augers and cranes, such as satellite communications antennas, radar antennas or the like could be transported and erected using this system.

Other variations, applications and ramifications of this invention will occur to those skilled in the art upon reading this disclosure. Those are intended to be included within the scope of this invention, as defined in the appended claims.

I claim:

1. A system for transporting and erecting very large and heavy construction equipment which comprises:
   a working component comprising the entire heavy construction equipment mounted on a sled like base;
   a carrier vehicle comprising means for moving a very heavy load off the normal vehicle roadway, said vehicle including a base and a turntable means supported by said base adapted to receive and support said working component;
   a transport vehicle capable of traveling on a vehicle roadway while carrying heavy construction equipment, including a bed positioned at an elevation substantially lower vertically than said turntable means and adapted to receive and support said working component;
   means on both said carrier vehicle and said transport vehicle to align said bed base and turntable means along a substantially straight line, said straight line declining in vertical elevation toward said transport vehicle; and
   transfer means to slide said sled like base and working component from one of said turntable means and bed to the other.

2. The system according to claim 1 wherein said transfer means comprises:
   hydraulic cylinder means capable of both a pulling and pushing action;
   attachment means for attaching one end of said hydraulic cylinder means to said sled-like base;
   securing means for detachably securing the other end of said hydraulic cylinder means to a selected point along said turntable means; and
   means to operate said hydraulic cylinder means to selectively draw said sled-like base onto said turntable means or push said sled-like base toward said trailer bed;
   whereby by sequentially connecting said securing means to a series of adjacent points along said turntable means in seriatim said sled may be moved stepwise onto or off of said turntable means.

3. The system according to claim 2 wherein said transfer means further includes:
   an outwardly extending flange positioned on each side of said sled-like base laying adjacent to the sliding surface and being substantially parallel to the direction of intended sliding movement; and
   at least one guide means on each side of said turn table means having a channel opening adapted to partially surround said flanges as said sled-like base slides along said turntable.

4. The system according to claim 3 wherein the first of said guide means encountered by said sled flange as it enters upon said turntable means has a decreasingly tapered entry section to accommodate slight misalignment of sled-like base and turntable means and guide said sled-like base to the desired sliding path.

5. The system according to claim 1 wherein said aligning means on said carrier vehicle includes at least one extendible outrigger means on each side of the carrier vehicle to stabilize said carrier vehicle when said turntable means extends toward the vehicle side.

6. The system according to claim 1 wherein said working component is a large earth auger including erection and drive means.

7. The system according to claim 1 wherein said working component is a large crane including boom erection and operating means.

8. The system according to claim 1 wherein said alignment means includes at least one large jack on said carrier vehicle to raise the front end of said carrier vehicle and at least one jack on said trailer to raise the front end of said trailer bed to bring said turntable means and said bed into substantially straight declining elevation alignment.

9. A method for transporting and erecting large, heavy construction equipment which comprises the steps of:
   providing a large low-boy type trailer with a goose-neck connected to a truck tractor;
   loading a working component comprising heavy construction equipment mounted on a sled-like base onto said trailer;
   driving said truck and trailer along normal roads to a selected construction job site;
   providing a carrier vehicle having a turntable mounted thereon, said carrier vehicle capable of carrying said working component on said turntable and of moving off-road;
   driving said carrier vehicle to said selected construction site along normal roads;
   removing said truck tractor and said goose-neck;
   positioning said carrier vehicle in front of said trailer with said turntable extending toward said trailer;
   aligning said turntable and said trailer by raising the front end of the carrier vehicle and the front end of said trailer until the bed of the trailer and the upper surface of the turntable lie substantially along a straight line;
   sliding said sled-like base from said trailer onto said turntable; and
   lowering the front end of said carrier vehicle into the operating position.

10. The method according to claim 9 including the further steps of:
   completing work at the construction site;
   again aligning said turntable and trailer bed along a substantially straight line;
   sliding said sled-like base back onto said trailer;
   replacing said goose-neck and truck tractor; and
   driving said carrier vehicle and truck and trailer to a new site along normal roads.

* * * * *